United States Patent [19]

Onishi et al.

[11] Patent Number: 5,784,621
[45] Date of Patent: Jul. 21, 1998

[54] SEQUENCE PROGRAM DISPLAY APPARATUS

[75] Inventors: Yasushi Onishi; Mitsuru Mochizuki, both of Yamanashi, Japan

[73] Assignee: Fanuc Ltd., Yamanashi, Japan

[21] Appl. No.: 530,720

[22] Filed: Sep. 15, 1995

[30] Foreign Application Priority Data

Oct. 25, 1994 [JP] Japan .................................. 6-260145

[51] Int. Cl.$^6$ ............................................. G06F 15/16
[52] U.S. Cl. ................................. 395/702; 364/147
[58] Field of Search ............................. 395/702; 364/147

[56] References Cited

U.S. PATENT DOCUMENTS

| | | | |
|---|---|---|---|
| 5,070,476 | 12/1991 | Fijiwara | 395/183.01 |
| 5,126,956 | 6/1992 | Komiya et al. | 364/147 |
| 5,218,525 | 6/1993 | Amasaki et al. | 395/183.14 |
| 5,276,811 | 1/1994 | Zifferer et al. | 395/704 |
| 5,463,544 | 10/1995 | Ohta | 395/183.14 |
| 5,485,620 | 1/1996 | Sadre et al. | 395/702 |
| 5,553,297 | 9/1996 | Yonezawa et al. | 364/147 |

*Primary Examiner*—Emanuel Todd Voeltz
*Assistant Examiner*—John Q. Chavis
*Attorney, Agent, or Firm*—Staas & Halsey

[57] ABSTRACT

In a sequence program display apparatus capable of displaying related data related to desired signals and command in debugging by simple operation, when the address of related data relating to respective signals and commands is input together with a sequence program, the input sequence program and address of the related data are stored in a program/address storing means. Program execution means controls the operation of a machine tool by executing the input sequence program. On the other hand, when display instruction means instructs to display how the particular signals and commands of the sequence program being executed are executed, executed state display means displays how the signals and commands instructed to be displayed are executed and how related data relating to the signals and commands is executed on the same screen in a display unit.

5 Claims, 6 Drawing Sheets

SEQUENCE PROGRAM DISPLAY APPARATUS

BACKGROUND OF THE INVENTION

(1) Field of the Invention

The present invention relates to a sequence program display apparatus for displaying a sequence program to be executed by a PC (programmable controller) on a screen, and more specifically, to a sequence program display apparatus for displaying how aimed signals and commands are executed in debugging.

(2) Description of the Related Art

Conventionally, when a sequence program is debugged, the sequence program expressed in, for example, a ladder mode is displayed on a screen and how signals and commands, which are displayed by being selected by an operator, are executed is displayed by blinking, coloring or the like.

When a debugging state is displayed as described above, it is sometimes desired to know how related data relating to the displayed signals and commands is executed. In such a case, the executed state and the like of the related data is conventionally displayed in a separate frame on the same screen by the key operation effected by the operator.

However, this method requires a time-consuming operation because the operator must input the address of related data through keys each time debugging is executed. Further, when signals and commands to which attention is to be directed change, related data also change accordingly, thus the address of related data must be input each time related data changes and thus a time-consuming job is required as a whole.

Further, related data relating to respective signals and commands must be stored on the side of the operator or managed in the form of a hard copy or the like.

SUMMARY OF THE INVENTION

An object of the present invention made to solve the above problem is to provide a sequence program display apparatus capable of displaying related data relating to desired signals and commands by a simple operation without the need of data management.

To achieve the above object, there is provided a sequence program display apparatus for displaying a sequence program to be executed by a PC (programmable controller) on a screen, which comprises program/address input means for inputting an address of related data relating to respective signals and commands together with the sequence program, program/address storing means for storing the input sequence program and the address of the related data, program execution means for controlling the operation of a machine tool by executing the input sequence program, display instruction means for instructing to display how the particular signals and commands of the sequence program being executed are executed, and executed state display means for displaying how the signals and commands instructed to be displayed are executed and how the related data relating to the signals and commands is executed on the same screen in a display unit.

When the address of related data relating to respective signals and commands is input together with a sequence program, the input sequence program and address of the related data are stored in program/address storing means. Program execution means controls the operation of a machine tool by executing the input sequence program.

On the other hand, when display instruction means instructs to display how the particular signals and commands of the sequence program being executed are executed, executed state display means displays how the signals and commands which are instructed to be displayed are executed and how related data relating to the signals and commands is executed on the same screen in a display unit.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the accompanying drawings.

Figure 1:
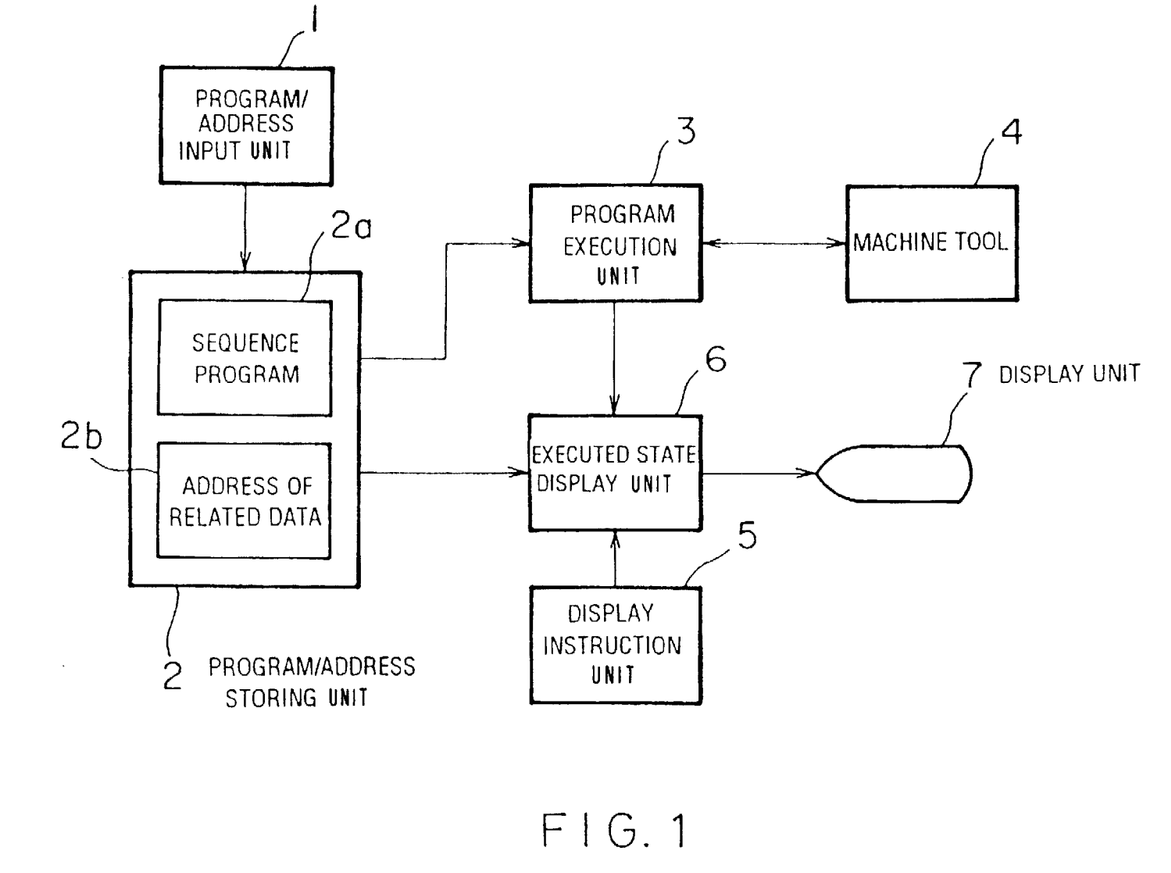
FIG. 1 is a view showing a concept of a function of an embodiment of the present invention.

FIG. 1 is a view showing a concept of a function of the embodiment of the present invention. When the address 2b of related data relating to respective signals and commands is input together with a sequence program 2a by program/address input unit 1, the input sequence program 2a and the input address 2b of the related data are stored in program/address storing unit 2. Program execution unit 3 controls the operation of a machine tool 4 by executing the input sequence program. On the other hand, when a display instruction unit 5 instructs to display how the particular signals and commands of the sequence program being executed are executed, executed state display unit 6 displays how the signals and commands instructed to be displayed are executed on the same screen in a display unit 7.

Figure 2:
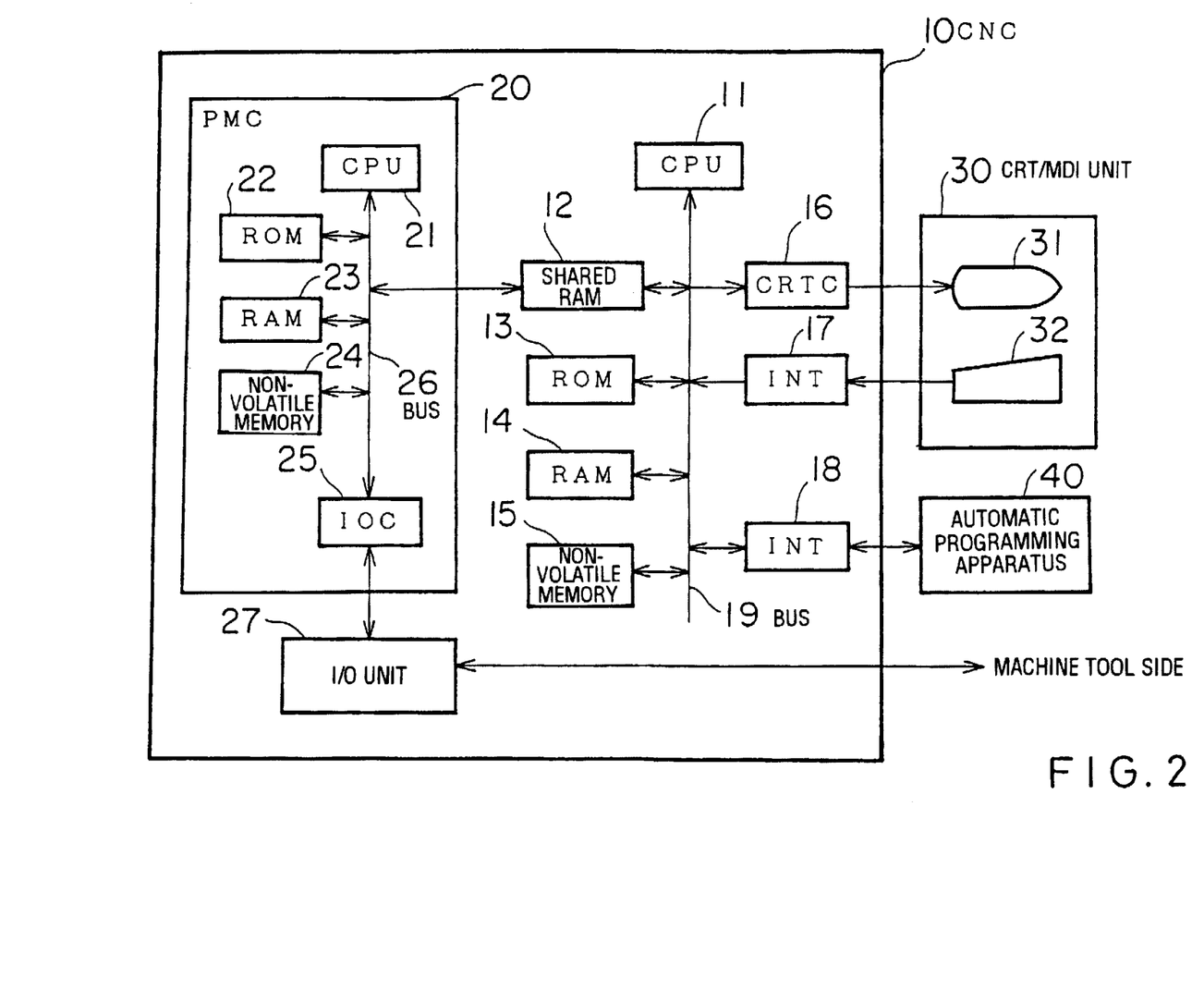
FIG. 2 is a block diagram of a hardware arrangement of a numerical control apparatus (CNC) as a whole embodying the present invention.

FIG. 2 is a block diagram of a hardware arrangement of a numerical control apparatus (CNC) as a whole embodying the present invention. A processor 11 for controlling the CNC 10 as a whole reads out a system program stored in a ROM 13 through a bus 19, and controls the CNC 10 according to the system program.

A shared RAM 12 enables the CNC 10 to transfer or receive data to or from a PMC 20, and thus the CNC 10 and PMC 20 transfer data to each other through the shared RAM 12. Further, the shared RAM 12 stores data needed to allow a simultaneous access by the CNC 10 and PMC 20.

A RAM 14 stores temporary calculation data, display data and the like. A non-volatile memory 15 is composed of a CMOS, flash ROM or the like backed up by a battery and stores amounts of tool compensation, amounts of pitch error compensation, machining programs, parameters and the like. In addition, the non-volatile memory 15 also stores parameters and the like needed by the PMC 20.

A graphic control circuit 16 converts digital data such as the present positions of respective axes, alarm, parameters, image data and the like into image signals and outputs the image signals. The image signals are transferred to a display unit 31 of a CRT/MDI unit 30 and displayed on the display unit 31. The display unit 31 can also display parameters of the PMC 20, ladder diagrams, trace data to be described later and the like. The data at the time is transferred from the PMC 20 through the shared RAM 12.

An interface 17 receives data input through a keyboard 32 in the CRT/MDI unit 30 and delivers the data to the processor 11. Further, data to the PMC 20 can be also input through the keyboard 32 and transferred to the PMC 20 through the shared RAM 12.

An automatic programming apparatus 40 is connected to an interface 18. A sequence program created by the automatic programming apparatus 40 is read through the interface 18 and transferred to the PMC 20. Further, debugging data is transferred from the CNC 10 to the automatic programming apparatus 40 through the interface 18. Further, external units such as a paper tape reader, paper tape puncher, paper tape reader/puncher, printer (not shown), and the like are connected to the interface 18. A machining program is read from the paper tape reader. Further, a machining program edited in the CNC 10 can be output to the paper tape puncher.

Note, the components such as the processor 11, shared RAM 12, ROM 13 and the like are interconnected through the bus 19. An axis control circuit for controlling servomotors and the like, servoamplifiers, a spindle control circuit, spindle amplifiers, a manual pulse generator interface and the like are omitted in FIG. 2.

The PMC (programmable machine controller) 20 is a kind of a PC (programmable controller) and contained in the CNC 10. The PMC 20 includes a processor 21 for the PMC. The processor 21 is connected to the shared RAM 12 through a bus 26. The shared RAM 12 is connected to the bus 19 of the CNC 10. Further, a ROM 22 is connected to the bus 26. The ROM 22 stores a management program for controlling the PMC 20.

An I/O signal is stored in a RAM 23 and the content of the I/O signal is rewritten as the sequence program is executed. A non-volatile memory 24 is composed of a CMOS, flash ROM or the like backed up by a battery and stores a sequence program created by the automatic programming apparatus 40 and the address of related data to be described later which is input when the sequence program is created. Although the sequence program is generally created by a ladder language, it may be created by a high-level language such as Pascal or the like. In operation, the sequence program stored in the non-volatile memory 24 is transferred to a RAM 23 and the processor 21 reads the sequence program in the RAM 23 and executes it. Further, the sequence program may be displayed on the display unit 31. The non-volatile memory 24 stores data which is to be retained after the power supply is turned off, trace data and the like to be described later, in addition to the sequence program.

An I/O control circuit 25 is connected to the bus 26, converts an output signal stored in the RAM 23 into a serial signal and transfers the serial signal to an I/O unit 27. Further, the I/O control circuit 25 converts a serial input signal from the I/O unit 27 into a parallel signal and transfers the parallel signal to the bus 26. The signal is stored in the RAM 23 by the processor 21. An I/O signal stored in the RAM 23 and the data stored in the non-volatile memory 24 may be displayed on the display unit 31 of the CRT/MDI unit 30.

The processor 21 receives command signals such as an M function command, T function command and the like, stores once the command signals in the RAM 23, processes them in accordance with the sequence program stored in the ROM 22 and outputs the processed signals to the I/O unit 27 through the I/O control circuit 25. The output signals control the hydraulic units, pneumatic units and electromagnetic units of the machine tool.

The processor 21 receives input signals such as a limit switch signal from the machine tool, a signal from an operation switch of a machine operation console, and the like and stores once the input signals in the RAM 23. Input signals which need not be processed by the PMC 20 is transferred to the processor 11 through the shared RAM 12. The other signals are processed by the sequence program and a part of the signals is output to the CNC and the remaining signals are output from the I/O unit 27 to the machine tool through the I/O control circuit 25 as output signals.

On the other hand, the sequence program may include commands for motion control of respective axes. When these commands are read out by the processor 21, they are transferred to the processor 11 through the shared RAM 12 and control the servomotors. Likewise, the spindle motors and the like may be controlled in response to a command from the PMC.

Figure 3:
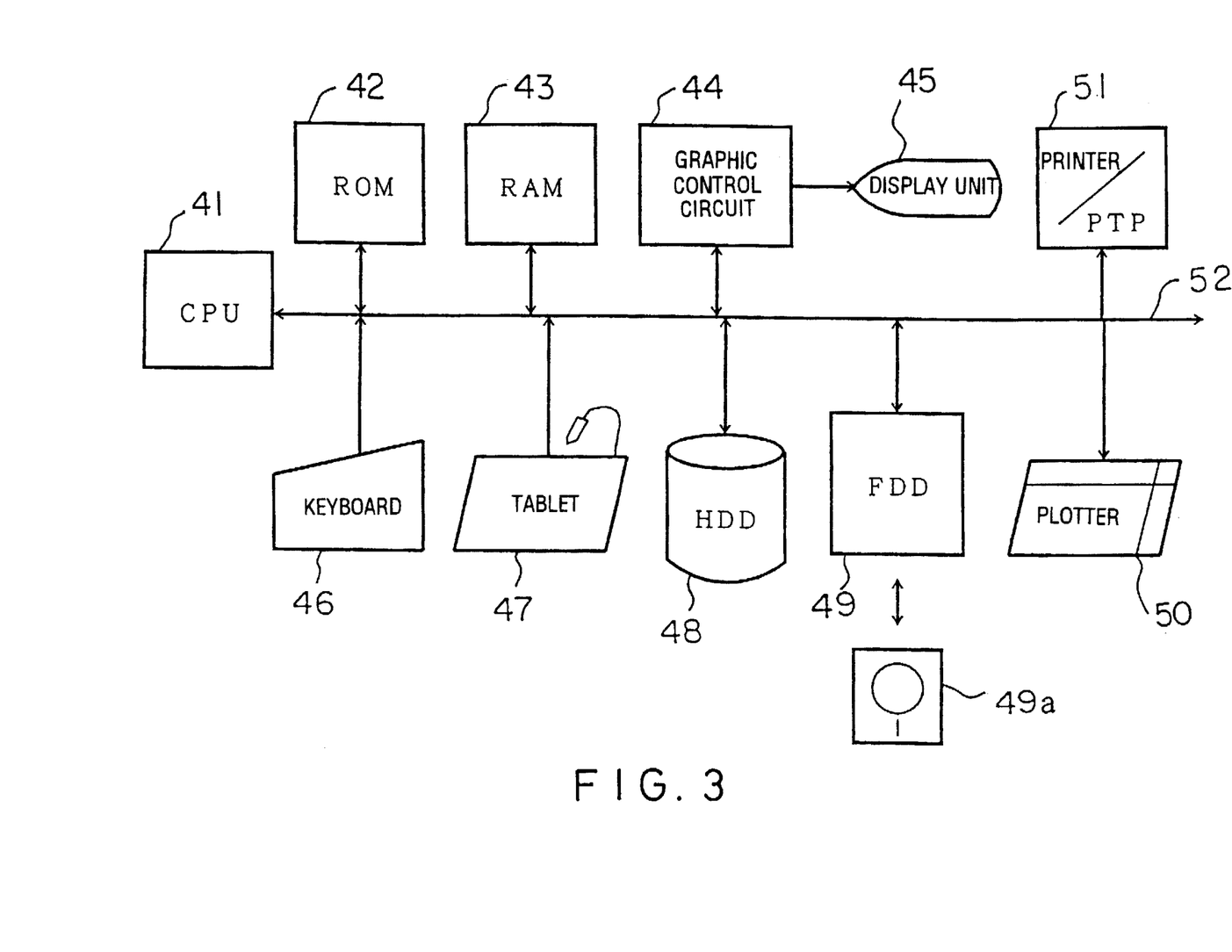
FIG. 3 is a block diagram of a hardware arrangement of an automatic programming apparatus.

FIG. 3 is a block diagram of a hardware arrangement of the automatic programming apparatus 40. A processor 41 controls the automatic programming apparatus 40 as a whole in accordance with a system program stored in a ROM 42. A RAM 43 stores internal data, a created sequence program and the like.

A graphic control circuit 44 converts display data from the processor 41 into a display signal and transfers the display signal to a display unit 45. On receiving the display signal, the display unit 45 displays it on a screen. The display unit 45 is composed of a CRT, liquid crystal display unit or the like.

A keyboard 46 includes operation keys used for data input, function keys and the like. Further, data may be also input through a tablet 47, a mouse (not shown), or the like.

An HDD (hard disk drive) 48 stores data to be retained after the power supply is turned off such as the created sequence program, related data and the like. An FDD (floppy disc drive) 49 can read out the sequence program and related data by driving a floppy disc 49a and writes a created or edited sequence program into the floppy disc 49a.

The created sequence program may be output to a plotter 50 and a printer/PTP (paper tape puncher) 51. Note, these components are interconnected through a bus 52.

The created sequence program is transferred to the CNC 10 through an interface (not shown). Further, debugging data and the like are transferred from the CNC 10.

Next, a specific example of a sequence program display apparatus of this embodiment will be described.

Figure 4:
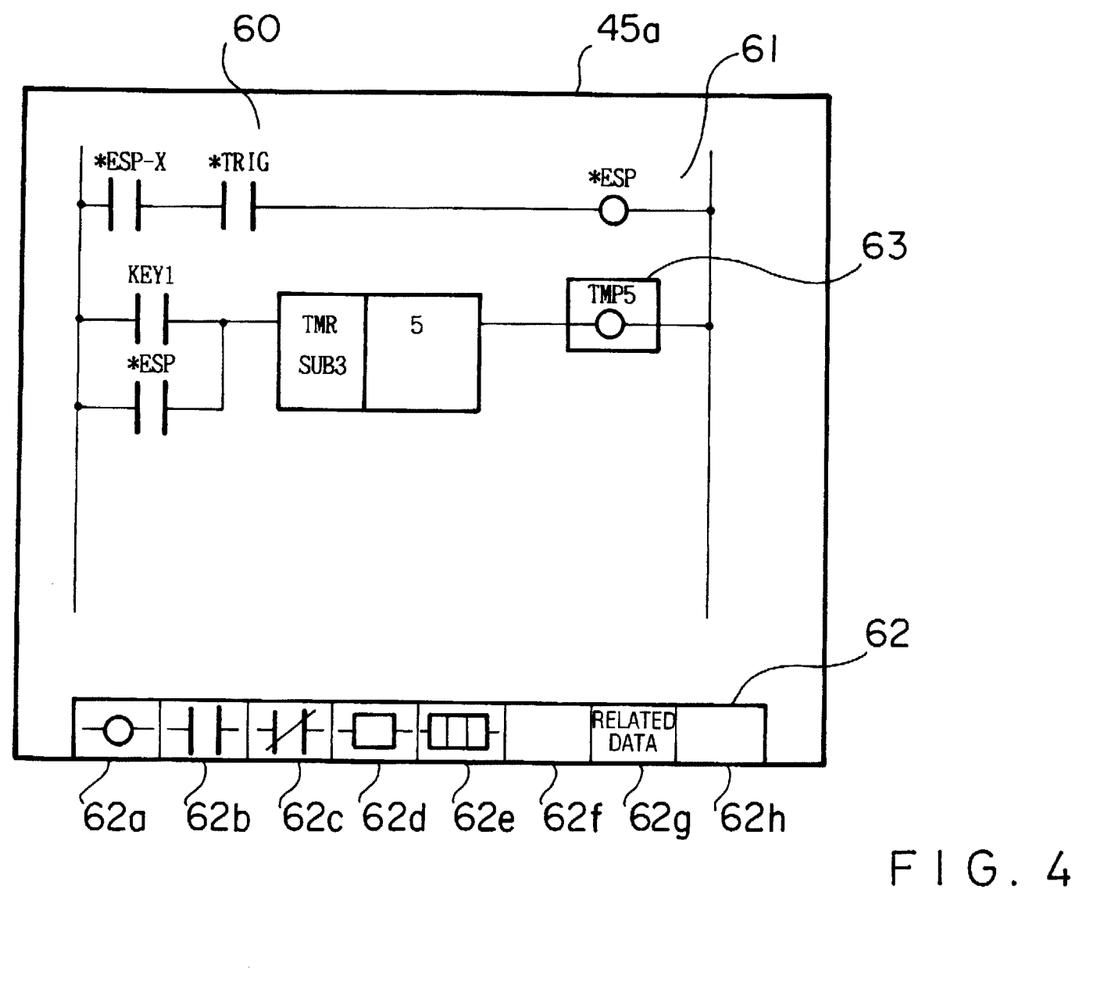
FIG. 4 is a view showing an example of a program creation screen of a sequence program in a display unit of the automatic programming apparatus.

FIG. 4 is a view showing an example of a program creation screen of a sequence program in the display unit 45 of the automatic programming apparatus 40. A created example of a ladder program expressed by a ladder diagram is shown here as the sequence program. A program creation screen 60 is displayed on a screen 45a of the display unit 45.

A ladder input display portion 61 and a menu display portion 62 composed of a software key are mainly formed in the program creation screen 60. The menu display portion 62 is composed of, for example, eight menus 62a–62h and the respective functions of them are selected and executed by depressing a corresponding function key in the keyboard. A ladder symbol is displayed in each of the menus 62a–62e of the menu display portion 62, and when any one of the menus is selected, the symbol of the menu is displayed at a position of a cursor 63.

On the completion of the input of a single rung, the operator selects a menu 62g to input related data relating to the rung, by which the screen 45a is switched to a related data input screen.

Figure 5:
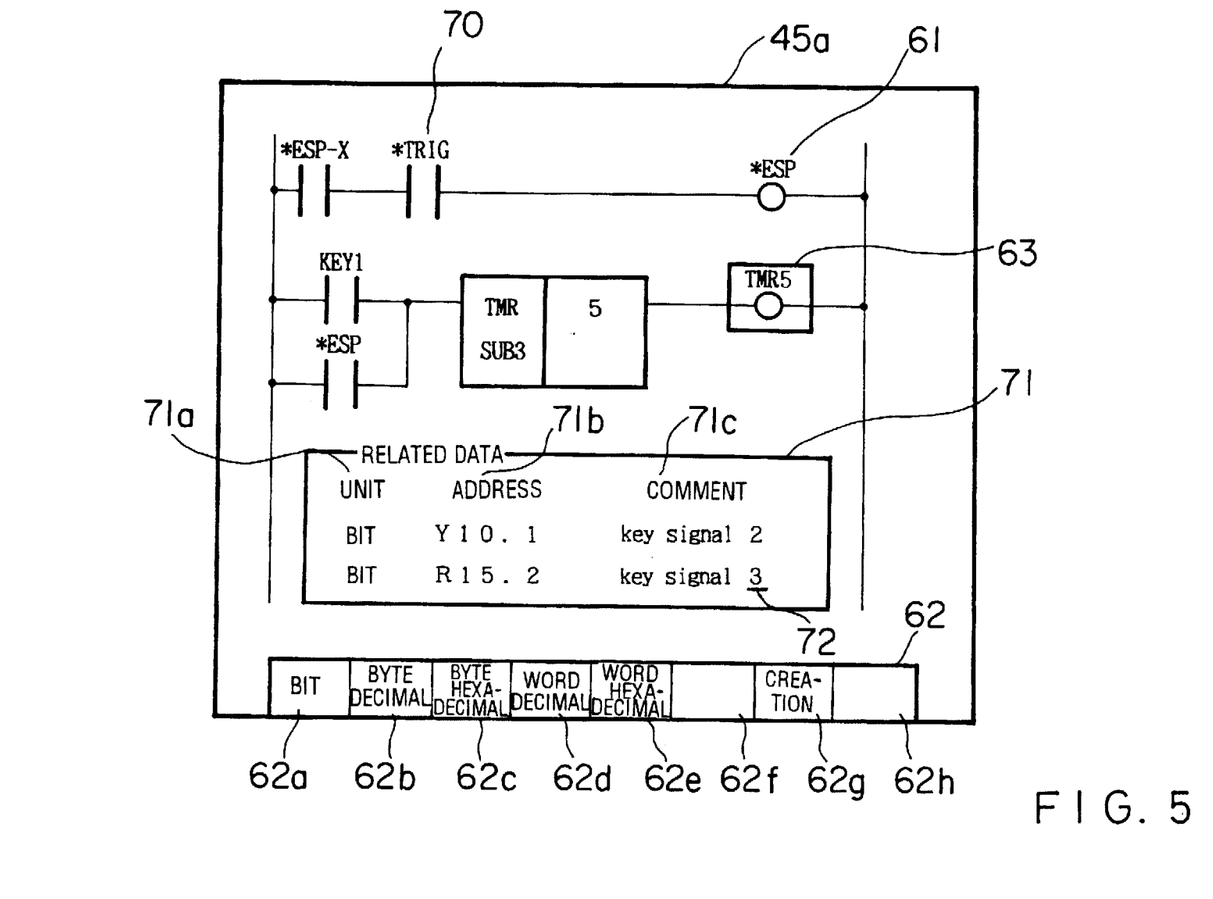
FIG. 5 is a view showing an example of a related data input screen.

FIG. 5 is a view showing an example of the related data input screen. A ladder input display portion 61 and a menu display portion 62 are displayed on a related data input screen 70 similarly to the program creation screen 60. A related data window 71 is displayed below the selected rung of the ladder input display portion 61. The contents of the respective menus 62a–62h in the menu display portion 62 are also switched in this case.

The related data window 71 is composed of a data display unit input column 71a, related data address input column 71b and comment input column 71c. The display unit input column 71a is a column for selecting a display mode from menu display potions 62a–62e by which desired data is displayed and displaying the selected display mode thereon. Data is displayed by a decimal or hexadecimal mode using a bit unit or byte unit, a decimal or hexadecimal mode using a word unit, and the like. When any one of these modes is selected by a function key, the selected mode is displayed in the display unit input column 71a.

As to the address input column 71b and comment input column 71c, when the cursor is moved to a portion where data is desired to be input and characters and numerals are input through the keyboard 46, an address and comment are displayed, respectively.

When the operator selects the menu 62g on the completion of the input of necessary data executed by the above operation, the screen 45a is switched to the program creation screen 60 again. As described above, related data relating to each rung of the input ladder program is transferred to the CNC 10 together with the ladder program.

Next, an example of the debugging of the ladder program to which the related data is input as described above will be described below.

Figure 6:
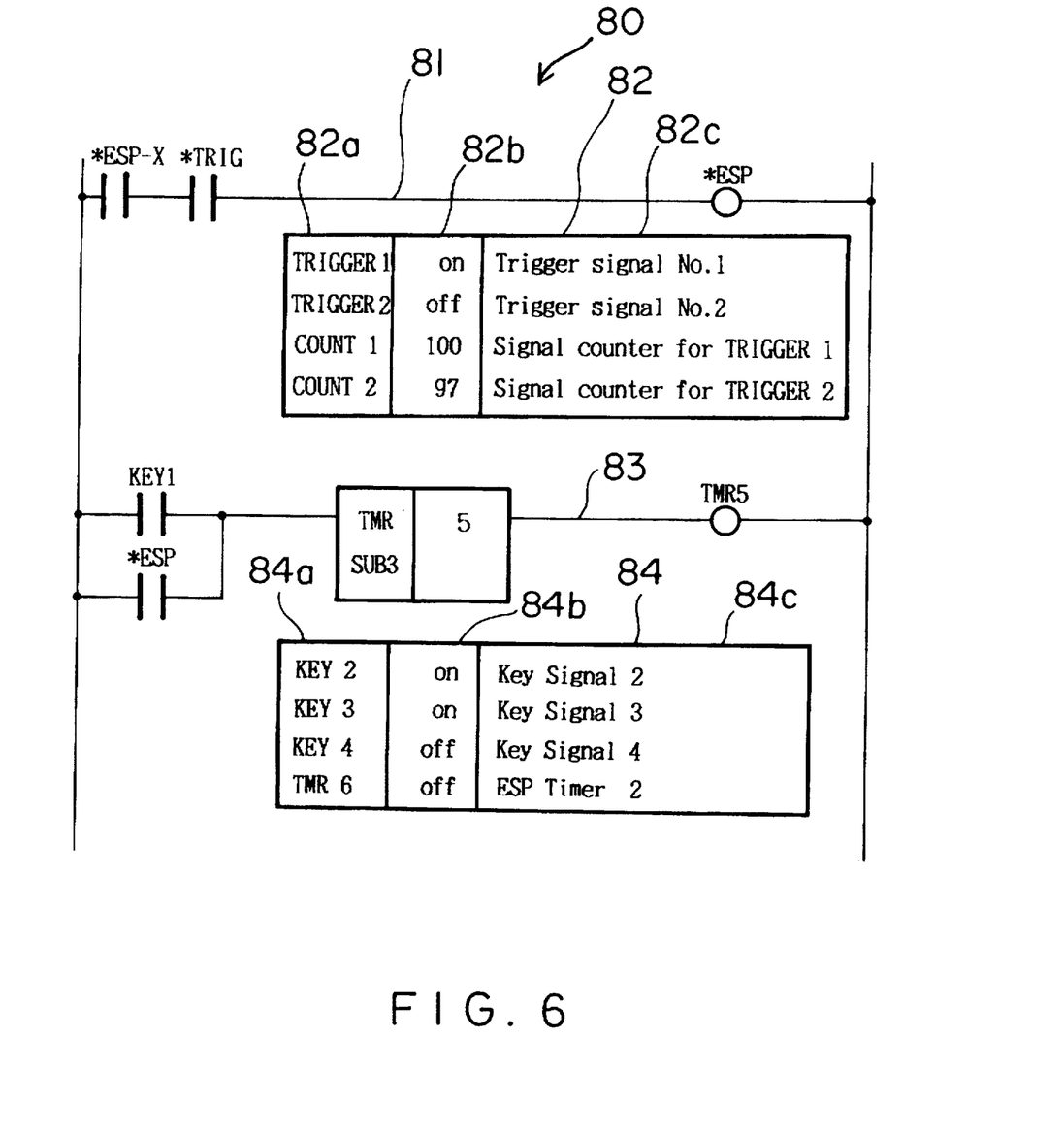
FIG. 6 is a view showing an example of a sequence program debugging screen in the display unit of the automatic programming apparatus.

FIG. 6 is a view showing an example of a sequence program debugging screen in the display unit 45 of the automatic programming apparatus 40. Note, FIG. 6 shows only data directly relating to the debugging and omits the menu display portion 62 and the like. The debugging screen 80 can display a desired ladder program by a predetermined key operation.

The debugging screen 80 displays related data 82 and 84 with respect to nets 81 and 83 selected through keys on the lower portion thereof. The related data 82 and 84 are composed of signal name display columns 82a, 84a, signal state display columns 82b, 84b and comment display columns 82c, 84c, respectively. The signal name display columns 82a, 84a displays the names of signals corresponding to addresses input on the related data input screen 70 of FIG. 5. The signal state display columns 82b, 84b display the present signal states of the respective signals. The comment display columns 82c, 84c display comments as to respective signals input on the related data input screen 70 of FIG. 5.

As the ladder program is executed, the debugging screen 80 displays the ON/OFF state and the like of the respective signals and commands of respective rungs 81, 83 by the change of brightness or color, or the like. Further, the signal state display columns 82b, 84b display the ON/OFF state of the signals and the like of the related data in the respective nets 81, 83 by characters and numerals.

As described above, according to this embodiment, since related data relating to respective nets of a ladder program is previously input on the related data input screen 70 and the related data 82, 84 and the like relating to the nets 81, 83 displayed on the debugging screen 80 are simultaneously displayed in debugging, the operator need not display related data by inputting an address through key operation each time the related data is needed. Further, since the address of related data is stored in the HDD 48 of the automatic programming apparatus 40, the floppy disc 49a, the non-volatile memory 24 of the PMC 20 and the like, data need not be individually managed. Consequently, the related data of desired signals and commands can be displayed by simple operation without the need of data management.

Although respective related data is displayed in a net unit in this embodiment, the data may be displayed in a row unit or a signal unit.

Although this embodiment shows a display example of the ladder program as a sequence program, it can display related data even if the sequence program is displayed in other modes.

Further, although this embodiment displays debugging data on the display unit 45 of the automatic programming apparatus 40, it may be displayed on the display unit 31 of the CNC 10.

As described above, according to the present invention, since the address of related data relating to respective signals and commands is stored in the program/address storing means together with a sequence program and how the related data is executed is displayed on the same screen of the display unit together with the particular signals and commands of the sequence program being executed, the related data of desired signals and commands can be displayed by simple operation without the need of data management.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A sequence program display apparatus for displaying a sequence program to be executed by a PC (programmable controller) on a screen, comprising:

program/address input means for inputting an address of related data relating to respective signals and commands together with said sequence program;

program/address storing means for storing said input sequence program and the address of said related data;

program execution means for controlling the operation of a machine tool by executing said input sequence program;

display instruction means for instructing to display how particular signals and commands of said sequence program being executed are executed; and executed state display means for displaying how said signals and commands instructed to be displayed are executed and how the related data relating to said signals and commands is executed on the same screen in a display unit.

2. A sequence program display apparatus according to claim 1, wherein said program/address input means inputs said related data in a unit of a rung of said sequence program.

3. A method of executing, debugging and displaying a sequence program executed by a programmable controller used to control a machine tool, comprising:

imputing an address of related data stored in said programmable controller is associated with a rung of said sequence program used to control said machine tool;

storing said input sequence program and said address of said related data;

controlling an operation of said machine tool by executing said rung of said sequence program in conjunction with said related data stored at said address; and displaying on a single screen a result of said machine tool executing said rung of said sequence program and executing said related data stored at said address.

4. A sequence program display apparatus displaying a sequence program controlling a machine tool, said sequence program display apparatus comprising:

a keyboard to input an address of a related data associated with at least one rung of said sequence program;

a programmable controller, coupled to the keyboard, controlling an operation of said machine tool by executing said rung of said sequence program in conjunction with said related data stored at said address in said programmable controller; and a display unit, coupled to the programmable controller, and the keyboard, displaying on a single screen thereof a result of said machine tool executing said rung of said sequence program and executing said related data stored at said address in said programmable controller.

5. A sequence program display apparatus displaying a sequence program used to control a machine tool, said sequence program display apparatus comprising:

a keyboard inputting an address at which related data is contained which is associated with a rung of said sequence program;

a storage unit, coupled to the keyboard, storing said input sequence program and said address of said related data;

a programmable controller, coupled to the storage unit and to the keyboard, controlling the operation of said machine tool by executing said rung of said sequence program in conjunction with said related data stored at said address; and a display unit, coupled to the keyboard, the storage unit, and to the programmable controller, displaying on a single screen thereof a result of said machine tool executing said rung of said sequence program and executing said related data stored at said address.

* * * * *